United States Patent
Guan (10) Patent No.: US 8,005,017 B2
(45) Date of Patent: Aug. 23, 2011

(54) METHOD FOR ESTABLISHING A MUTICAST LSP, SYSTEM FOR TRANSMITTING MULTICAST DATA

(75) Inventor: Hongguang Guan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 378 days.

(21) Appl. No.: 12/327,967

(22) Filed: Dec. 4, 2008

(65) Prior Publication Data

US 2009/0175273 A1 Jul. 9, 2009

Related U.S. Application Data (63) Continuation of application No. PCT/CN2007/000828, filed on Mar. 15, 2007.

(30) Foreign Application Priority Data

Jun. 5, 2006 (CN) .......................... 2006 1 0061017

(51) Int. Cl.
H04L 12/28 (2006.01)
H04L 12/56 (2006.01)
(52) U.S. Cl. ........ 370/254; 370/389; 370/390; 370/392; 370/395.2; 370/400; 370/431; 370/432
(58) Field of Classification Search .................. 370/389, 370/395.2, 400
See application file for complete search history.

(56) References Cited

U.S. PATENT DOCUMENTS

| | | | | |
|---|---|---|---|---|
| 6,816,966 B1 * | 11/2004 | Gupta et al. | ................. | 713/163 |
| 6,947,428 B1 * | 9/2005 | Andersson et al. | ........ | 370/395.5 |
| 7,839,850 B2 * | 11/2010 | Kompella | ..................... | 370/390 |
| 7,843,896 B2 * | 11/2010 | Shimizu et al. | ............... | 370/351 |
| 7,848,224 B2 * | 12/2010 | Bryant et al. | ................. | 370/216 |
| 2005/0152286 A1 * | 7/2005 | Betts et al. | ..................... | 370/255 |
| 2005/0169266 A1 * | 8/2005 | Aggarwal et al. | ............. | 370/389 |
| 2005/0169270 A1 * | 8/2005 | Mutou et al. | ................... | 370/390 |
| 2005/0201273 A1 | 9/2005 | Shimizu | | |
| 2007/0253416 A1 * | 11/2007 | Raj | ............................... | 370/390 |

FOREIGN PATENT DOCUMENTS

| | | |
|---|---|---|
| CN | 1507230 A | 6/2004 |
| CN | 1668032 A | 9/2005 |
| CN | 101043429 B | 9/2007 |

(Continued)

OTHER PUBLICATIONS

Communication in counterpart European Application No. 07 720 410.5-1244, mailed Aug. 3, 2010.

(Continued)

Primary Examiner — Hassan Phillips
Assistant Examiner — Lonnie Sweet
(74) Attorney, Agent, or Firm — Leydig, Voit & Mayer, Ltd.

(57) ABSTRACT

The embodiment of the present invention discloses a method for establishing a multicast LSP and a system for transmitting multicast data. The method includes: a MSA node learns and stores multicast stream information; the egress edge node in the MPLS domain obtains the multicast stream information sent by the MSA node by sending a query request message to the MSA node; the egress edge node joins the multicast group, according to the obtained multicast stream information, and establishes a multicast LSP between the ingress edge node and the egress edge node. The technical solution of the present invention supports dynamic implementation of multicast services, and reduces the cost of maintaining a network topology.

16 Claims, 6 Drawing Sheets

FOREIGN PATENT DOCUMENTS

| | | |
|---|---|---|
| JP | 2005-080244 A | 3/2005 |
| JP | 2005-244847 A | 9/2005 |

OTHER PUBLICATIONS

Minei, I., et al., "Label Distribution Protocol Extensions for Point-to-Multipoint and Multipoint-to-Multipoint Label Switched Paths—draft-ietf-mpls-ldp-p2mp-00," Network Working Group, Internet Draft, Feb. 26, 2006.

Ooms, D., et al., "Overview of IP Multicast in a Multi-Protocol Label Switching (MPLS) Environment," Network Working Group, Aug. 2002.

Aggarwal, R., et al., "MPLS Upstream Label Assignment for LDP—draft-ietf-mpls-ldp-upstream-00.txt," Network Working Group, Internet Draft, Mar. 2006.

Aggarwal, R., et al., "MPLS Upstream Label Assignment for RSVP-TE—draft-ietf-mpls-rsvp-upstream-00.txt," Network Working Group, Internet Draft, Mar. 2006.

Aggarwal, R., et al.,"MPLS Upstream Label Assignment and Context Specific Label Space—draft-ietf-mpls-upstream-label-00.txt," Network Working Group, Internet Draft, Feb. 2006.

Minei et al., "Label Distribution Protocol Extensions for Point-to-Multipoint and Multipoint-to-Multipoint Label Switched Paths," *Internet Engineering Task Force(IETF)*, IETF Standard Working Draft, 1-20 (Oct. 14, 2005) http://draft-minei-wijnands-mpls-ldp-p2mp-00.txt.

Xu et al., "An Aggregated-Based Multicast Strategy for MPLS," *IEEE*, International Conference on Wireless Communications, Networking and Mobile Computing, 2: 1044-1046 (Sep. 2005).

* cited by examiner

METHOD FOR ESTABLISHING A MUTICAST LSP, SYSTEM FOR TRANSMITTING MULTICAST DATA

CROSS-REFERENCE TO RELATED APPLICATIONS

This application is a continuation of International Patent Application No. PCT/CN2007/000828, filed Mar. 15, 2007, which claims priority to Chinese Patent Application No. 200610061017.3, filed Jun. 5, 2006, both of which are hereby incorporated by reference in their entirety.

FIELD OF THE INVENTION

The present invention relates to the field of network communication technologies, and, in particular, to a method for establishing a multicast Label Switched Path (LSP) and a system for transmitting multicast data.

BACKGROUND

With the maturity of the Multi-Protocol Label Switching (MPLS) related standards and the popularization of the network multimedia applications, such as IPTV and videoconference, multicast technologies are applied to support the point-to-multipoint and multipoint-to-multipoint communications in a MPLS network, which has become an effective technical method for reducing bandwidth consumption and improving the Quality of Service (QoS).

In the conventional MPLS multicast application solution, a Label Switched Path (LSP) can be established in two ways: (i) a downstream node sends a label mapping to an upstream node to establish a LSP; or (ii) an upstream node receives a request of joining a multicast group from a downstream node, and allocates a label to the downstream node to establish a LSP. The two conventional methods are elaborated below with reference to the accompanying drawings.

Figure 1:
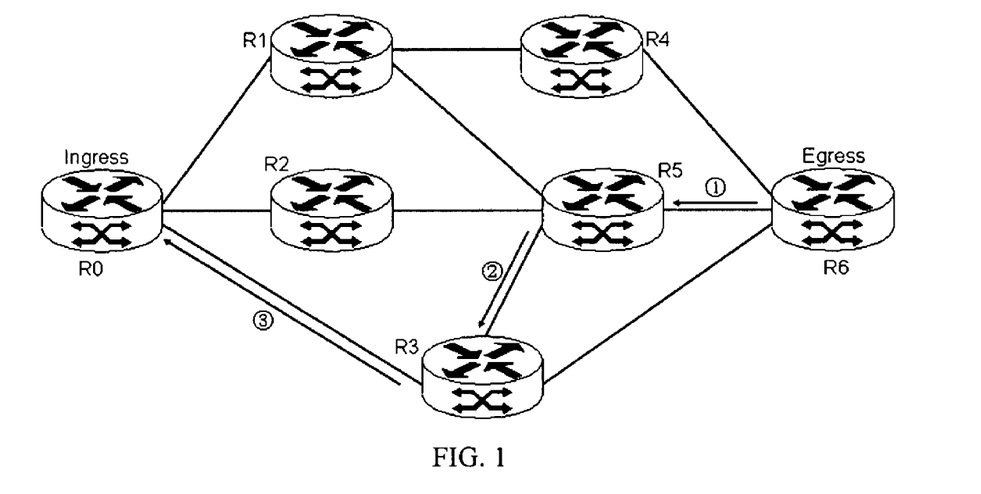
FIG. 1 is a schematic diagram showing how an egress node sends a label mapping message to establish a LSP in a MPLS domain.

As shown in FIG. 1, in a MPLS domain, an egress node is directly connected with the multicast receiving user node, for example, the R6 node shown in FIG. 1; and an ingress node is directly connected with the multicast source, for example, the R0 node shown in FIG. 1. A multicast data stream enters a MPLS domain from an ingress node (R0), passes through intermediate nodes R3 and R5 along the route, and is sent by the egress node (R6) to the multicast receiving user. The method, in which a downstream node sends a label mapping message to an upstream node to establish a LSP, includes the steps as described below.

Step 1: The egress node R6 sends a local label mapping message to the upstream node R5 with respect to a multicast stream.

Step 2: The intermediate node R5 sends a local label mapping message to the upstream node R3.

Step 3: R3 sends a local label mapping message to the upstream node R0 (namely, the ingress node).

Through the previous steps, a LSP (R0->R3->R5->R6) is established for the multicast stream from an ingress node to an egress node.

Figure 2:
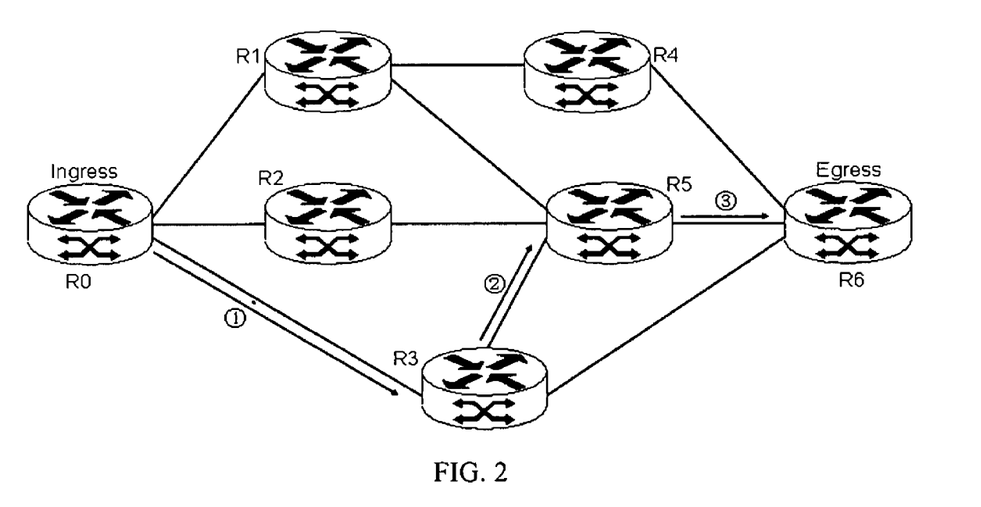
FIG. 2 is a schematic diagram showing how an ingress node allocates a label actively to establish a LSP in a MPLS domain.

As shown in FIG. 2, R6 is an egress node, and R0 is an ingress node. A multicast data stream enters a MPLS domain from an ingress node (R0), passes through intermediate nodes R3 and R5 along the route, and is sent by the egress node (R6) to the multicast receiving user. Alternatively, a multicast LSP may also be established through allocating, by the upstream node, a label to the downstream node actively, and this method includes the steps as described below.

Step 1: After receiving a request of joining a multicast stream receiving sequence from an ingress node R6, the ingress node R0 allocates a label to the downstream node R3 with respect to the multicast stream.

Step 2: The R3 allocates a label to the downstream node R5.

Step 3: The R5 allocates a label to the downstream node R6 (namely, egress node).

Through the previous steps, a LSP (R0->R3->R5->R6) is established for the multicast stream from an ingress node to an egress node.

As described above, all the conventional methods for establishing a multicast LSP in a MPLS domain require that the egress node directly connected with the multicast receiver must know the location of the ingress node before being able to establish a multicast LSP for a multicast stream. In other words, when establishing a conventional multicast LSP in a MPLS domain, a mapping relationship is statically preset between the multicast source and the multicast group on the egress node; otherwise, the egress node is unable to know the location of the ingress node or establish a multicast LSP between the ingress node and the egress node. With the application of the multicast services, such as IPTV, multi-party video conference, tele-education, and tele-consultation, it is necessary to configure every mapping relationship and maintain the network topology in order to statically configure a mapping relationship between the multicast source and the multicast group. The rapid growth of the multicast service requires maintenance of plenty of network topologies, which leads to higher and higher cost of maintenance. Meanwhile, the mapping relationship configured statically between the multicast source and the multicast group is unable to meet the requirements of on-demand dynamic development trend of multicast services.

Moreover, the mapping relationship configured statically between the multicast source and the multicast group is not conducive to multicast access control (for example, access license, bandwidth control, and priority setting). Only simple mapping is performed between the multicast source and the multicast group, without attaching the information on multicast access control policies to the mapping relationship. Therefore, the prior art is unable to control multicast access in the process of establishing a LSP.

SUMMARY

An embodiment of the present invention provides a method for establishing a multicast LSP, a system for transmitting multicast data, and a node device, with a view to establishing a multicast LSP in the MPLS domain.

An embodiment of the present invention provides a method for establishing a multicast LSP, including: learning and storing, by a Multicast Source Agent (MSA) node, multicast stream information; and receiving, by the MSA node, a query request message in the MPLS domain, and obtaining and sending the corresponding multicast stream information to the egress edge node, in order to enable the egress edge node to join the multicast group, according to the obtained multicast stream information, and to establish a multicast LSP between the ingress edge node and the egress edge node itself.

An embodiment of the present invention further provides a multicast data transmission system, including: an egress edge node, an ingress edge node, and a MSA node.

The MSA node further includes: a message receiving module, adapted to receive the query request message sent to the multicast source node; a storing module, adapted to learn and store the multicast stream information in the MPLS domain;

and a sending module, adapted to obtain the corresponding multicast stream information from the storing module, according to the query request message, and send the information to the egress edge node.

The egress edge node is adapted to establish a multicast LSP with the ingress edge node, according to the multicast stream information sent by the MSA node.

An embodiment of the present invention further provides a node device, including: a storing module, adapted to learn and store the multicast stream information in the MPLS domain; a message receiving module, adapted to receive the query request message sent by the query request node; and a sending module, adapted to obtain the corresponding multicast stream information from the storing module according to the query request message, and send the information to the query request node.

As can be seen from the technical solution of the embodiments of the present invention that, a node is set as a Multicast Source Agent (MSA) node in the MPLS domain for the purpose of learning and storing the multicast stream information and obtaining the dynamic mapping relationship between the multicast source and multicast group. If unaware of the location of the ingress edge node, the egress edge node can obtain the location of the ingress node by sending a query request to the MSA node, and establish a LSP between the ingress node and the egress node itself, thus, supporting dynamic implementation of multicast services and reducing the cost of maintaining the network topology.

BRIEF DESCRIPTION OF THE DRAWINGS

The accompanying drawings are intended for better understanding of the present invention and constitute part of this application rather than limiting the present invention.

DETAILED DESCRIPTION

In order to make the objectives, technical solution and merits of the present invention clearer, a detailed description of the present invention is given below with reference to accompanying drawings and preferred embodiments. The exemplary embodiments and description thereof are intended for interpreting, rather than limiting, the present invention.

The method and the multicast data transmission system of the present invention are elaborated below, with reference to accompanying drawings and embodiments.

In the technical solution of an embodiment of the present invention, a Network Management System (NMS) appoints any node in the MPLS domain as a MSA node. The location of the MSA node can be configured manually in a static mode or notified to every node in the MPLS domain dynamically through a flood message.

Figure 3:
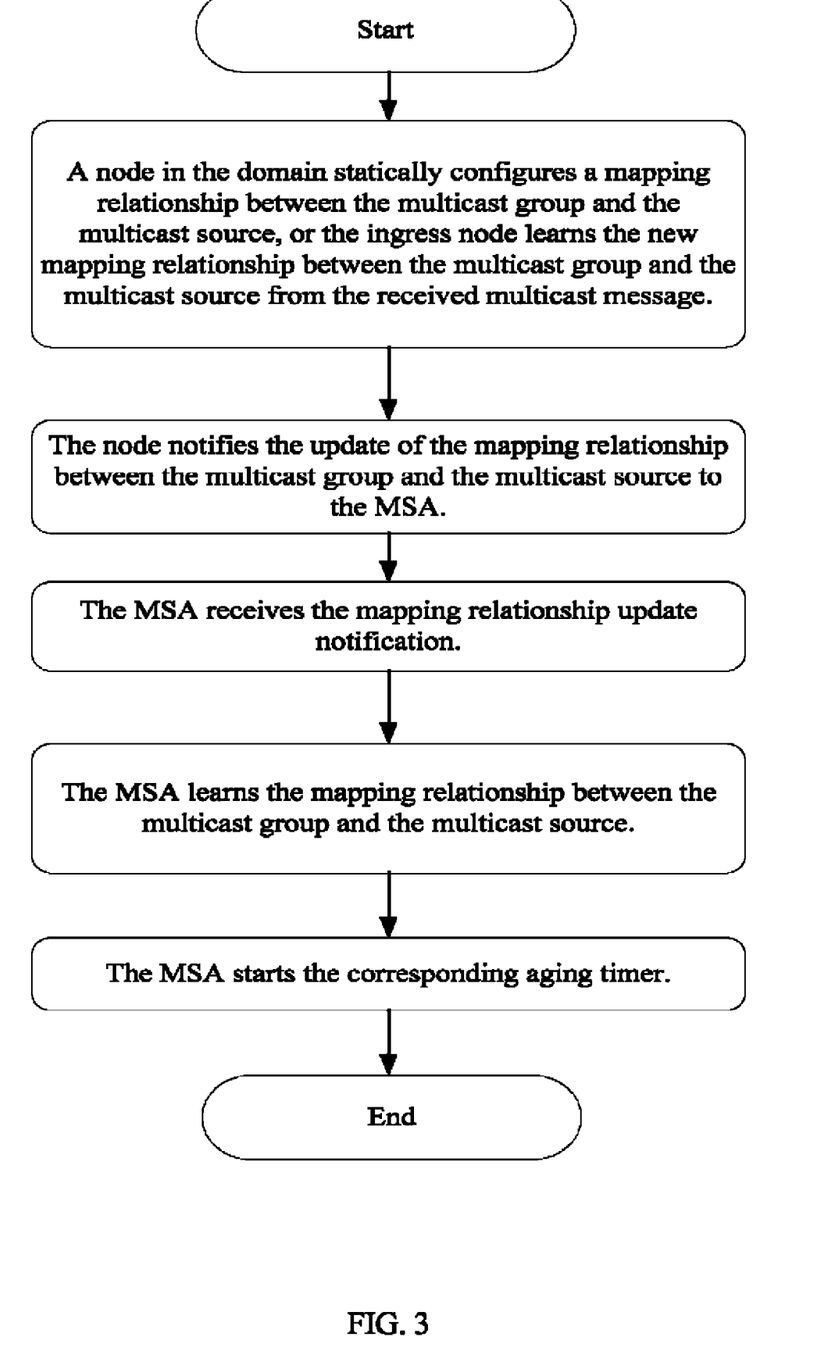
FIG. 3 is a flowchart of the method for a MSA node to learn multicast stream information, according to an embodiment of the present invention.

In the technical solution of an embodiment of the present invention, if a mapping relationship is configured statically between the multicast group and the multicast source on a node in the MPLS domain, the node will notify the MSA of the static mapping relationship between the multicast group and the multicast source; if the ingress node learns a new mapping relationship between the multicast group and the multicast source from the received multicast message, the ingress node will also notify the MSA of the dynamic mapping relationship between the multicast group and the multicast source. After receiving the notification about the mapping relationship between the multicast group and the multicast source, the MSA will store it to the local device, and start a corresponding aging timer. This process is shown in FIG. 3.

Figure 4:
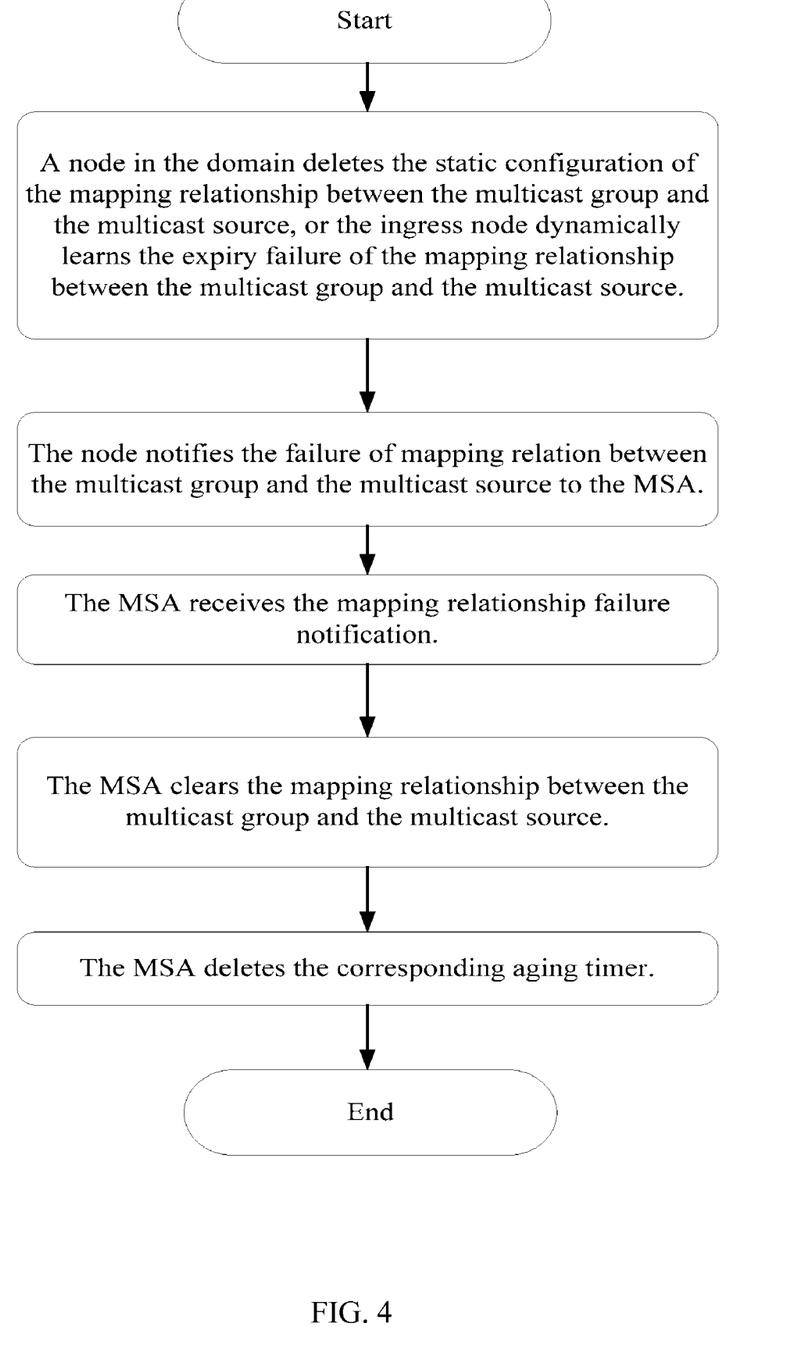
FIG. 4 is a flowchart of the method for deleting multicast stream information after a MSA node has aged, according to an embodiment of the present invention.

If the mapping relationship between the multicast group and the multicast source configured statically on a node in the MPLS domain is deleted, the node will notify the MSA node that the static mapping relationship between the multicast group and the multicast source fails; if the ingress node dynamically learns that the mapping relationship between the multicast group and the multicast source fails, the ingress node will also notify the MSA node that the dynamic mapping relationship between the multicast group and the multicast source fails. After receiving the notification about failure of the mapping relationship between the multicast group and the multicast source, the MSA will clear the mapping relationship between the multicast group and the multicast source, and delete the corresponding aging timer. This process is shown in FIG. 4.

Figure 5:
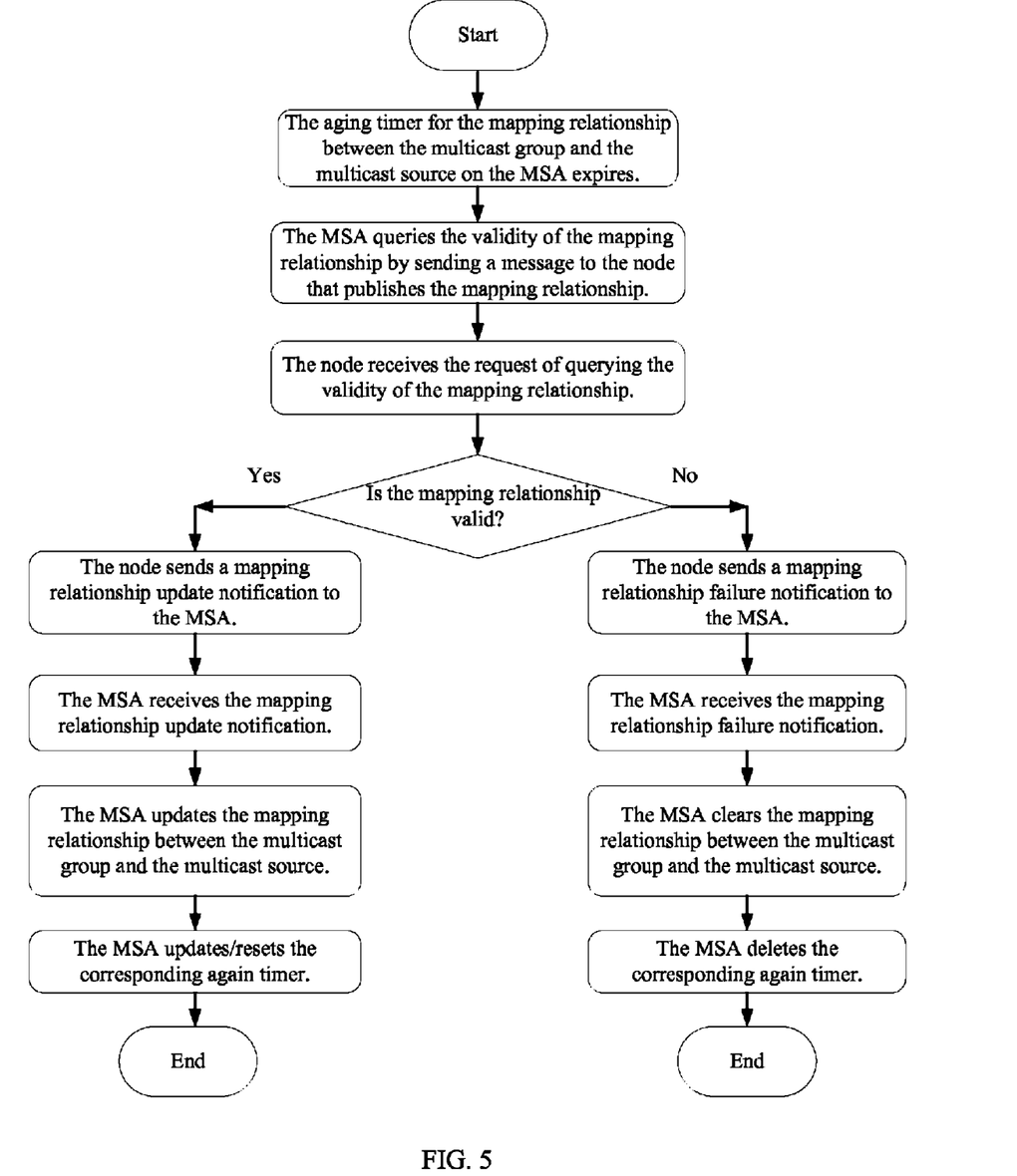
FIG. 5 is a flowchart of the method for a MSA node to query the validity of the multicast stream information, according to an embodiment of the present invention.

Upon timeout of the aging timer corresponding to the mapping relationship between the multicast group and the multicast source on the MSA, the MSA will send a message to the node that publishes the mapping relationship to query the validity of the mapping relationship. If the mapping relationship is still valid on this node, the node will publish an update message to the MSA node with respect to the mapping relationship; after receiving the update message, the MSA will update the validity period of the mapping relationship between the multicast group and the multicast source (for example, resetting/updating the corresponding aging timer). If the node finds that the mapping relationship is invalid, the node will publish a failure notification to the MSA with respect to the mapping relationship; after receiving the failure message, the MSA will clear the mapping relationship between the multicast group and the multicast source and delete the corresponding aging timer. This process is shown in FIG. 5.

Optionally, in the process of querying the validity of the mapping relationship between the multicast group and the multicast source initiated by the MSA node, if the MSA does not receive any response from the node that publishes the mapping relationship, the MSA will check whether the aging timer times out. If so, the MSA will clear the mapping relationship between the multicast group and the multicast source and delete the corresponding aging timer.

Figure 6:
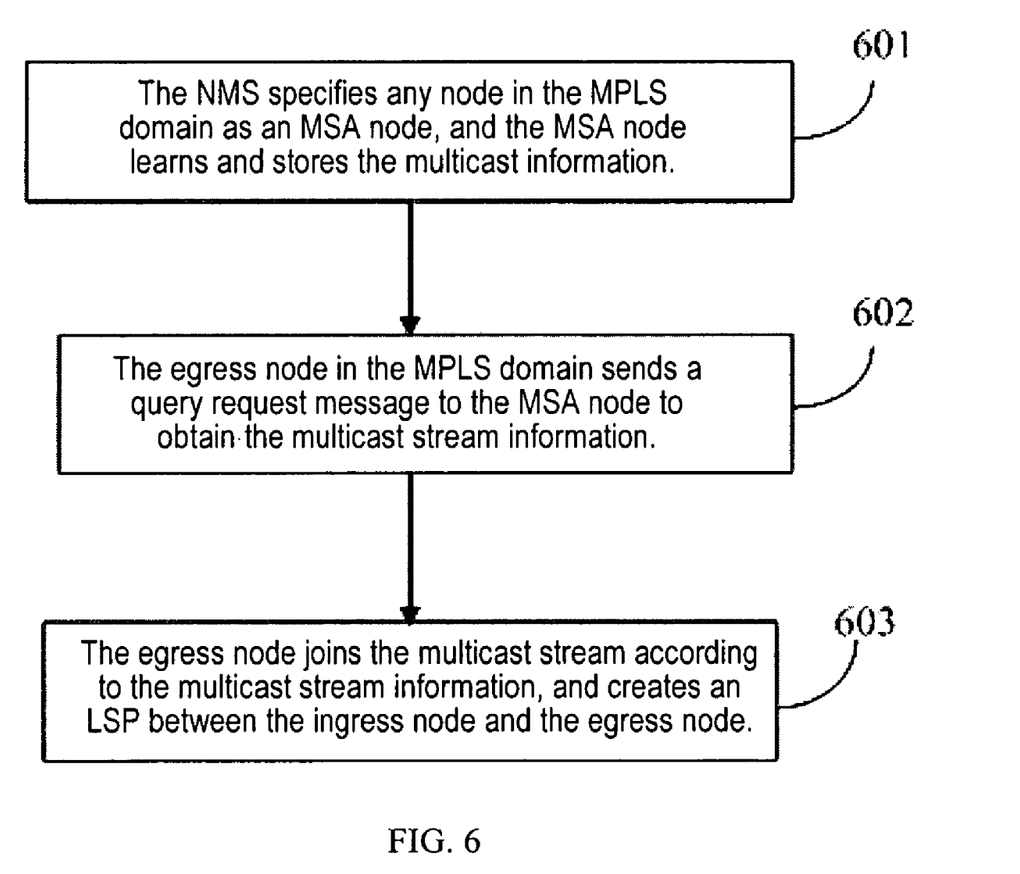
FIG. 6 is a flowchart of the method for establishing a multicast LSP in a MPLS domain, according to an embodiment of the present invention.

As shown in FIG. 6, the method for establishing a multicast LSP in a MPLS domain according to an embodiment of the present invention includes the steps as described below.

S601: The MSA node learns and stores multicast stream information.

The multicast stream information includes: the mapping relationship between the multicast group and the multicast source, and/or the location of the ingress node.

S602: The egress node in the MPLS domain sends a query request message to the MSA node to obtain the multicast stream information;

After receiving the query request message, the MSA node searches the multicast stream information storing unit of the node. If no proper result is found, the MSA will send a query response message to notify the node that the corresponding mapping relationship does not exist. If the corresponding mapping relationship is found, the MSA will send a query response message to notify the query result. A query result contains the mapping relationship between the multicast group and the multicast source, and the location of the node that publishes the mapping relationship.

Optionally, the node in the MPLS domain may send a query request message to the MSA with respect to the mapping relationship between the multicast group and the multicast source. Such request messages may be intended to query the multicast source and/or the location of the node that publishes the mapping relationship with respect to the multicast group, or intended to query the list of the multicast groups available from a multicast source with respect to the multicast source.

S603: The egress node joins the multicast stream according to the multicast stream information, and establishes a LSP between the ingress node and the egress node.

During this process, an application control policy may be attached to the multicast stream information sent by the MSA node. The application control policy may come from the multicast source, policy server, or Network Management System (NMS). Application control policies include: allowing the node that sends the query request to access the corresponding multicast stream; and restrictions on the access, for example, access license, bandwidth control, priority setting, and specified path. The specific application control policy is determined, according to the objective of the control and the specific implementation method.

Specifically, after receiving a query request, the MSA node can query whether the node is authorized to access the multicast stream. If the node is not authorized, the MSA node will return a response about rejection of the access request of the node. If the node is authorized to access the multicast group, the MSA will notify the node of the restriction information related to the multicast stream and the node, for example, bandwidth restriction, access priority, specified path, and time segment restriction. Therefore, the node can apply such control policies in the process of establishing a multicast LSP.

According to the validity response received from the MSA node, the egress node obtains the mapping relationship between the multicast group and the multicast source and the location of the node (for example, ingress node) that publishes the mapping relationship, and then publishes a local label mapping message to the upstream intermediate node along the path toward the ingress node with respect to the multicast stream. The intermediate node further sends a local label mapping message to the upstream node along the path in the same direction with respect to the multicast stream, until the ingress node receives the label mapping message sent by a downstream node. Finally, a LSP is established with respect to the multicast stream successfully.

An alternative method for establishing a LSP between the ingress node and the egress node is: the ingress node allocates a label to the downstream node actively. The specific process is: according to the validity response received from the MSA node, the egress node obtains the mapping relationship between the multicast group and the multicast source and the location of the node (for example, ingress node) that publishes the mapping relationship; the egress node requests the ingress node to join the multicast stream receiving sequence; after receiving the request, the ingress node allocates a label to the downstream intermediate node along the direction toward the egress node with respect to the multicast stream; the intermediate node further allocates a label to its downstream node along the path in the same direction with respect to the multicast group, until the egress node receives the label allocated with respect to the multicast group; and the LSP is established.

Another method for establishing a LSP between the ingress node and the egress node is a combination of the previous two methods. The specific process is: according to the validity response received from the MSA node, the egress node obtains the mapping relationship between the multicast group and the multicast source and the location of the node (for example, ingress node) that publishes the mapping relationship; the egress node requests the ingress node to join the multicast stream receiving sequence; after receiving the request, the ingress node publishes a label request to the downstream node with respect to the multicast stream; after receiving the label request, the downstream node allocates a label with respect to the multicast stream, and publishes a label mapping message to the upstream node.

In this LSP, each node publishes a label mapping message to the upstream node independently with respect to the multicast stream; and the LSP is established successfully.

As can be seen from the technical solution of the embodiments the present invention that, application control policies can be attached onto the multicast stream information sent by the MSA node. The application control policies are attached in the process of establishing a LSP between the egress node and the ingress node; thus, controlling the multicast access and providing differentiated multicast application services.

Figure 7:
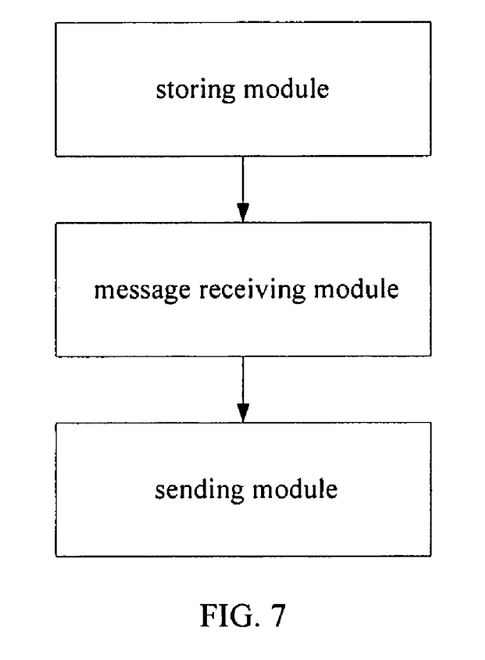
FIG. 7 is a schematic diagram of a MSA node device provided in an embodiment of the present invention.

As shown in FIG. 7, a MSA node device provided in an embodiment of the present invention includes: a storing module, adapted to learn and store the multicast stream information in the MPLS domain, wherein the multicast stream information is synchronous with the multicast stream information in the multicast source node; a message receiving module, adapted to receive the query request message sent by the query request node to the multicast source agent node; and a sending module, adapted to obtain the corresponding multicast stream information from the storing module according to the query request message, and send the information to the query request node.

Figure 8:
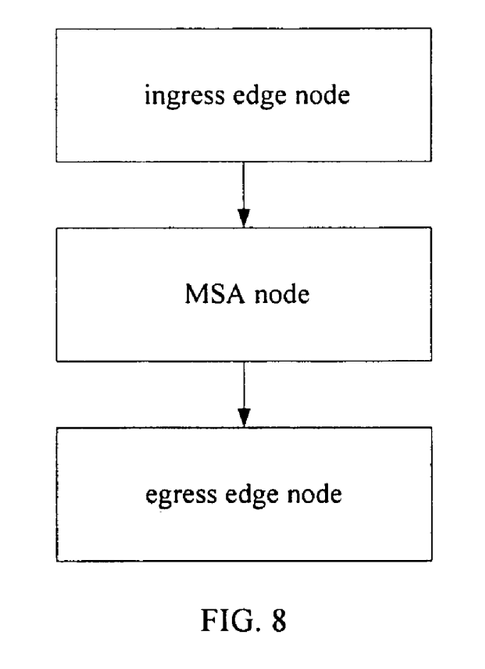
FIG. 8 is a schematic diagram of a multicast data transmission system in a MPLS domain provided in an embodiment of the present invention.

As shown in FIG. 8, a multicast data transmission system in a MPLS domain provided in an embodiment of the present invention includes multiple nodes such as a multicast source node, an egress edge node, an ingress edge node, and a MSA node.

The NMS can appoint any node in the MPLS domain as a MSA node for the purpose of learning and storing multicast stream information; when a node in a MPLS domain (such as an egress node) sends a query request message to the MSA node, the MSA node sends multicast stream information to the egress node.

The MSA node includes: a message receiving module, adapted to receive the query request message, and send it to the multicast stream information storing module; a storing module, adapted to store the multicast stream information in the MPLS domain, and send the corresponding multicast stream information to the multicast stream information sending module; and a sending module, adapted to send multicast stream information to the node that sends the query request.

If the egress node wants to join a multicast stream but no mapping relationship is configured statically between the multicast group and the multicast source, a query request message will be sent to the MSA node. After receiving a validity response from the MSA node, the egress node establishes a LSP between the ingress node and the egress node, according to the multicast stream information sent by the MSA node.

If it is necessary to perform multicast access control for an egress node that sends a query request, application control policy information can be attached onto the multicast stream information sent by the MSA node. The application control policies serve as restriction conditions for establishing a LSP between the ingress node and the egress node.

Although detailed description is given to the preferred embodiments of this invention, the embodiments are intended to interpret rather than restrict the present invention. It is apparent that those skilled in the field can make various modifications and equivalent substitutions to the invention without departing from the spirit and scope of the present invention. The scope of the present invention intends to be defined by the accompanying claims.

What is claimed is:

1. A method for establishing a multicast Label Switched Path (LSP) in a Multi-Protocol Label Switching (MPLS) domain, comprising:
   learning and storing, by a Multicast Source Agent (MSA) node, multicast stream information, wherein the multicast stream information includes a mapping relationship between a multicast group and a multicast source, and/or the location of an ingress node in the MPLS domain, and wherein the MSA node starts a corresponding aging timer when the MSA node receives a new mapping relationship between the multicast source and the multicast group, and deletes the corresponding aging timer when the MSA node receives a notification about failure of the relationship between the multicast source and the multicast group;
   receiving, by the MSA node, a query request message in the MPLS domain, and obtaining and sending corresponding multicast stream information to an egress edge node in the MPLS domain;
   joining, by the egress edge node, the multicast group according to the obtained multicast stream information, and establishing a multicast LSP between the ingress edge node and the egress edge node.

2. The method of claim 1, wherein before the MSA node learns and stores the multicast stream information, the method further comprises:
   appointing any one of the nodes in the MPLS domain as the MSA node;
   wherein the location of the MSA node is statically configured at each node in the MPLS domain; or
   the location of the MSA node is notified to each node in the MPLS domain through a flood message.

3. The method of claim 1, wherein the procedure, in which the MSA node learns and stores multicast stream information, comprises:
   notifying, by a node in the MPLS domain, a change of a statically configured mapping relationship between the multicast source and the multicast group to the MSA node; or
   notifying, by the ingress edge node, a change of a dynamic mapping relationship between the multicast source and the multicast group obtained from the received multicast message to the MSA node.

4. The method of claim 1, wherein, upon timeout of the aging timer, the MSA node queries the node that publishes the corresponding multicast stream information on the validity of the multicast stream information;
   according to the response from the node that publishes the corresponding multicast stream information, the MSA node updates/clears the multicast stream information, and resets/deletes the aging timer.

5. The method of claim 4, wherein if the MSA node receives no response and detects that the aging timer times out, the MSA node clears the multicast stream information and deletes the aging timer.

6. The method of claim 1, wherein the procedure of sending the corresponding multicast stream information to the egress edge node further comprises:
   adding application control policy information to the multicast stream information sent by the MSA node; the application control policy information comprises information on whether to allow the node that sends the query request to access the multicast stream and establish an LSP; or control information on restricting the node that sends the query request from-accessing the multicast stream or establishing an LSP.

7. A multicast data transmission system in a Multi-Protocol Label Switching (MPLS) domain, comprising an egress edge node, an ingress edge node, and a Multicast Source Agent (MSA) node, multicast, wherein
   the MSA node learns and stores multicast stream information, wherein the multicast stream information includes a mapping relationship between a multicast group and a multicast source, and/or the location of the ingress node, starts a corresponding aging timer when the MSA node receives a new mapping relationship between the multicast source and the multicast group, deletes the corresponding aging timer when the MSA node receives a notification about failure of the relationship between the multicast source and the multicast group, receives a query request message sent in the MPLS domain, and obtains and sends the corresponding multicast stream information to the egress edge nod;
   the egress edge node joins the multicast group according to the obtained multicast stream information, and establishes a multicast Label Switched Path (LSP) between the ingress edge node and the egress edge node.

8. The multicast data transmission system of claim 7, wherein the multicast stream information sent by the MSA node further comprises application control policy information; the application control policy information comprises information on whether to allow the node that sends the query request to access the multicast stream and establish an LSP; or control information on restricting the node that sends the query request from-accessing the multicast stream or establishing an LSP.

9. The multicast data transmission system of claim 7, wherein:
   any one of nodes in the MPLS domain is appointed as the MSA node;
   the location of the MSA node is configured at each node in the MPLS domain statically; or
   the location of the MSA node is notified to each node in the MPLS domain through a flood message.

10. The multicast data transmission system of claim 7, wherein the ingress edge node notifies a change of a dynamic mapping relationship between the multicast source and the multicast group to the MSA node.

11. A method for establishing a multicast Label Switched Path (LSP) in a Multi-Protocol Label Switching (MPLS) in an MPLS domain, comprising:

notifying, by any one of nodes in the MPLS domain, a change of a static mapping relationship between a multicast source and a multicast group to a multicast source agent (MSA) node, or notifying, by an ingress edge node in the MPLS domain, a change of a dynamic mapping relationship between the multicast source and the multicast group to the MSA node;

learning and storing, by the MSA node, multicast stream information, wherein the multicast stream information includes: a mapping relationship between a multicast group and a multicast source, and/or the location of the ingress node, and wherein the ingress node is directly connected with the multicast source;

receiving, by the MSA node, a query request message in the MPLS domain, and obtaining and sending corresponding multicast stream information to an egress edge node in the MPLS domain;

joining, by the egress edge node, the multicast group according to the obtained multicast stream information, and establishing a multicast LSP between the ingress edge node and the egress edge node.

12. The method of claim 11, wherein before the MSA node learns and stores the multicast stream information, the method further comprises:

appointing any one of nodes in the MPLS domain as the MSA node; and the location of the MSA node is configured statically at each node in the MPLS domain; or the location of the MSA node is notified to each node in the MPLS domain through a flood message.

13. The method of claim 11, wherein the procedure, in which the MSA node learns and stores multicast stream information, further comprises:

starting a corresponding aging timer when the MSA node receives a new mapping relationship between the multicast source and the multicast group; and deleting the corresponding aging timer when the MSA node receives a notification about failure of the relationship between the multicast source and the multicast group.

14. The method of claim 13, wherein, upon timeout of the aging timer, the MSA node queries the node that publishes the corresponding multicast stream information on the validity of the multicast stream information;

according to the response from the node that publishes the corresponding multicast stream information, the MSA node updates/clears the multicast stream information, and resets/deletes the aging timer.

15. The method of claim 13, wherein if the MSA node receives no response and detects that the aging timer times out, the MSA node clears the multicast stream information and deletes the aging timer.

16. The method of claim 11, wherein the procedure of sending the corresponding multicast stream information to the egress edge node further comprises:

adding application control policy information to the multicast stream information sent by the MSA node; the application control policy information comprises information on whether to allow the node that sends the query request to access the multicast stream and establish an LSP; or control information on restricting the node that sends the query request from-accessing the multicast stream or establishing an LSP.

* * * * *

UNITED STATES PATENT AND TRADEMARK OFFICE
CERTIFICATE OF CORRECTION

| | | |
|---|---|---|
| PATENT NO. | : 8,005,017 B2 | Page 1 of 1 |
| APPLICATION NO. | : 12/327967 | |
| DATED | : August 23, 2011 | |
| INVENTOR(S) | : Hongguang Guan | |

It is certified that error appears in the above-identified patent and that said Letters Patent is hereby corrected as shown below:

Title page, Item (54) in the title, "Muticast" should read -- Multicast --.

Column 1, line 1, "Muticast" should read -- Multicast --.

Signed and Sealed this
Twenty-second Day of November, 2011

David J. Kappos
*Director of the United States Patent and Trademark Office*